US006607860B2

United States Patent
Hulbert et al.

(10) Patent No.: US 6,607,860 B2
(45) Date of Patent: Aug. 19, 2003

(54) SERVICEABLE FUSED BATTERY TERMINAL

(75) Inventors: Benjamin C. Hulbert, Tucson, AZ (US); James Roberts, Royal Oak, MI (US); James L. Jones, III, White Lake, MI (US); Thomas Rumsey, Livonia, MI (US)

(73) Assignee: EWD, L.L.C., El Paso, TX (US)

( * ) Notice: Subject to any disclaimer, the term of this patent is extended or adjusted under 35 U.S.C. 154(b) by 94 days.

(21) Appl. No.: 09/768,834

(22) Filed: Jan. 24, 2001

(65) Prior Publication Data
US 2002/0098413 A1 Jul. 25, 2002

(51) Int. Cl.$^7$ ................................. H01M 2/30
(52) U.S. Cl. ...................... 429/178; 429/121
(58) Field of Search ................ 429/121, 178; 439/754, 757; 337/290, 295

(56) References Cited

U.S. PATENT DOCUMENTS 4,243,292 A * 1/1981 Kinnear .................... 439/519
5,805,047 A   9/1998 DeVilleroche et al.
6,162,098 A * 12/2000 Cheng et al. ............... 439/621
6,309,260 B1 * 10/2001 Shannon ..................... 174/84 R

FOREIGN PATENT DOCUMENTS

EP     1134843 A2 * 9/2001 ........... H01R/11/28

* cited by examiner

*Primary Examiner*—Patrick Ryan
*Assistant Examiner*—Gregg Cantelmo
(74) *Attorney, Agent, or Firm*—Young & Basile P.C.

(57) ABSTRACT

A serviceable fused battery terminal comprising a disposable fused battery end containing a fuse link, the disposable fused battery end being initially integrated with a cable-connecting portion of the terminal which is secured to an electrical cable, for example by crimping in known manner. When the fuse blows, the battery end is removed from the cable-connecting end by breaking or separating it, while the cable-connecting end remains secured to the cable in its original fashion. A portion of the cable-connecting end is formed as a reattachment point for a replacement fused battery end 22, which is then secured to the remaining original cable-connecting end to create a new fused terminal. The inventive terminal allows for the easy replacement of blown fuses in the field without having to cut or otherwise remove the cable-connecting portion of the terminal from the cable.

6 Claims, 4 Drawing Sheets

SERVICEABLE FUSED BATTERY TERMINAL

FIELD OF THE INVENTION

The present invention is in the field of automotive-type battery terminals which incorporate fuse links in the terminal structure.

BACKGROUND OF THE INVENTION

Battery terminals are known in which terminals adapted at one end to be secured to a battery post, and at the other end to be crimped to a wire or cable, include an intermediate fuse link between the terminal connection point and the wire connection point so as to interrupt the connection in the event of overcurrent. Such fuse-integrating terminals are often in the form of clamp-type or eyelet-type terminals adapted to be secured at one end to a vehicle battery post.

While such fuse-incorporating terminals provide convenient overcurrent protection without the need for separate fuse structure or wiring, when the fuse link does blow, the replacement of the terminal is time-consuming since it must not only be disconnected from the battery post, but further must be uncrimped from the wire or cable to which it is secured and replaced with an entirely new fused terminal unit.

SUMMARY OF THE INVENTION

The present invention is a fused battery terminal which is more easily serviced (i.e., replaced) when the fuse link built into the terminal blows. The terminal includes a battery connection end incorporating the fuse link, and a cable connection end adapted to be mechanically and electrically connected to a power supply cable. A portion of the terminal between the fused battery end and the cable-connecting end is designed to be easily separated, cut or broken when the fuse blows so that the fused battery end can be discarded and replaced with a new fused battery end. To achieve a simple, field-replaceable connection between the cable-connecting end and the new fused battery end, the cable-connecting end is provide with a reattachment section that survives the separation in a form adapted to be easily secured to a mating portion of the new fused battery end. In one preferred embodiment, the new fused battery end is different from the original, discarded fused battery end, in that the new fused battery end has attachment structure mateable with the reattachment section of the cable-connecting end.

In a preferred form, the reattachment section of the cable-connecting end is provided with a bolt hole adapted to be connected by bolt or similar connector to a bolt hole on the new fused battery end.

These and other features and advantages of the invention will become more apparent upon further reading of the specification, in light of the accompanying drawings.

DETAILED DESCRIPTION OF THE ILLUSTRATED EMBODIMENTS

Figure 1:
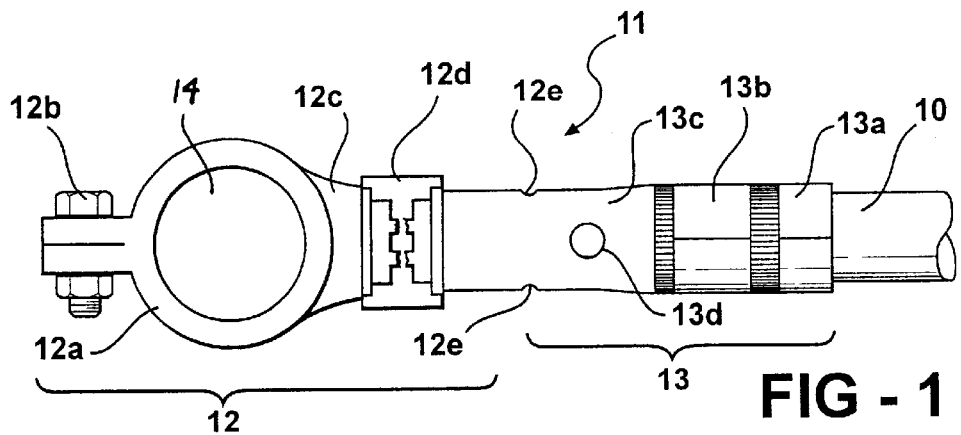
FIG. 1 is a plan view of a fused battery terminal according to the present invention, in a fuse-blown condition.

Referring first to FIGS. 1 and 1A, a fused battery terminal 11 according to the invention is shown connecting a cable 10 to a battery post 14. Fused terminal 11 includes a battery end 12 connected to the battery post 14, and a cable-connecting end 13 connected to cable 10. Terminal clamping halves 12a squeezed together by a bolt connector 12b, wire connecting stem 12c, and fuse link 12d comprise a general type of structure well known to those skilled in the art. This is a representative example only; one possible, known alternative includes a flat, annular eyelet in place of the partially split clamping halves 12a.

The similarity to the prior art ends, however, with a separation region 12e in stem 12c, in the illustrated embodiment denoted by a notched portion of the relatively flat stem. Separation region 12e is formed as an integral part of the fused terminal 11 as a whole, i.e. integral with battery end 12 and cable-connecting end 13.

Cable-connecting end 13 comprises a standard set of insulation crimping tabs 13a engaging the insulation 10a of cable 10; a set of wire crimping tabs 13b engaging an area of exposed wire 10b at the end of the cable to create an electrical connection; and a stem portion 13c. However, stem 13c of the cable-connecting end 13 is designed as a serviceable re-attachment portion, in the illustrated embodiment having a hole 13d for a purpose described below.

Figure 2:
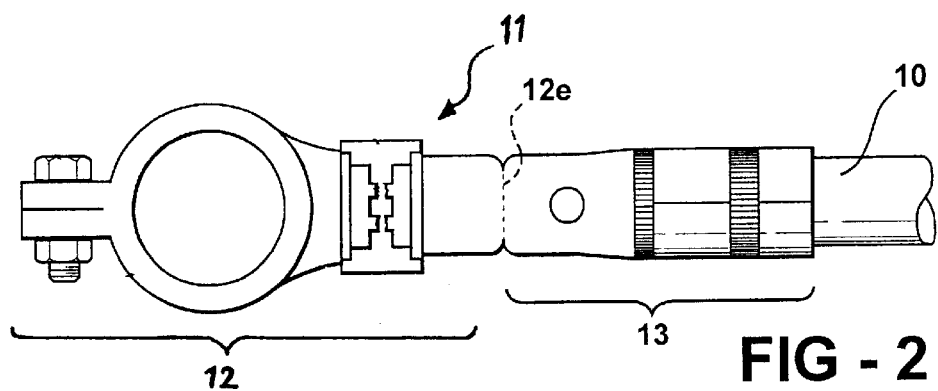
FIG. 2 is a plan view of the battery terminal of FIG. 1, illustrating the point of separation of the fused battery end from the cable-connecting end.
Figure 2A:
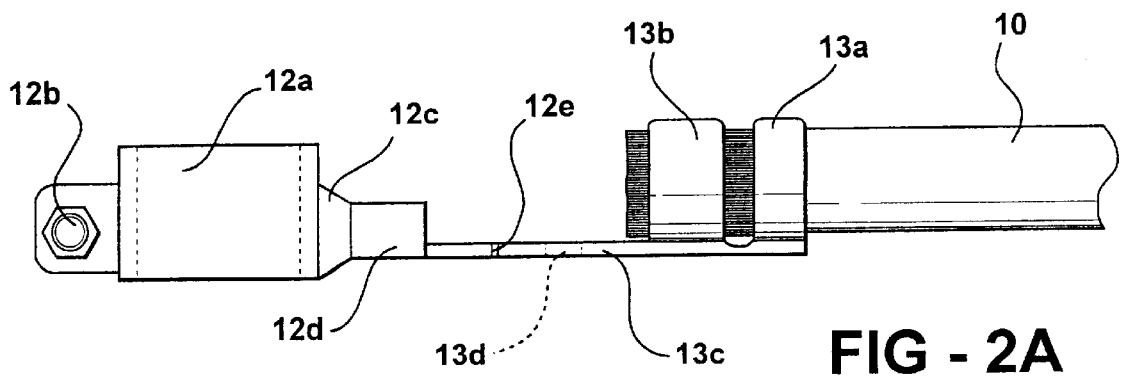
FIG. 2A is a side elevational view of FIG. 2.
Figure 3:
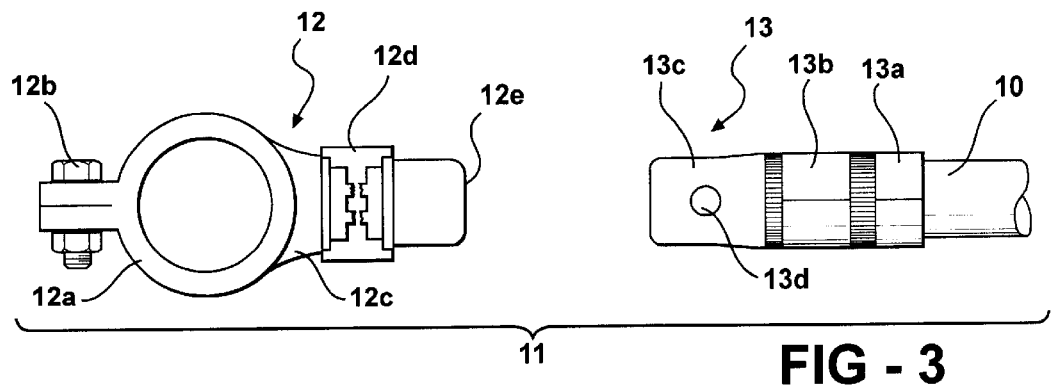
FIG. 3 illustrates the blown, fused battery end of the terminal separated from the cable-connecting end.
Figure 3A:
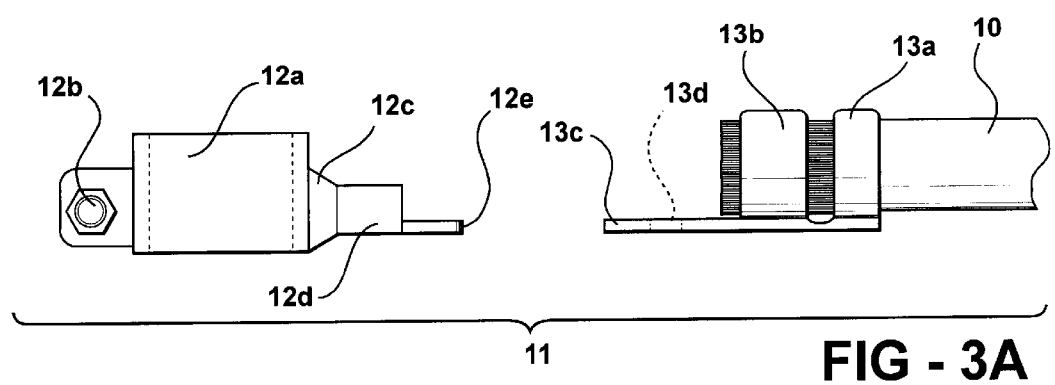
FIG. 3A is a side elevational view of FIG. 3.

Referring next to FIG. 2, once vehicle operators or maintenance personnel realize that the fused link 12d in terminal 11 has been blown, battery end 12 is removed from battery post 14 and separated from cable-connecting end 13 by breaking, cutting, or otherwise removing battery end 12 at separation region 12e. For this purpose, visible separation features such as notches 12e are useful in defining the separation point. However, it will be understood by those skilled in the art that other types of separation means can be employed at the separation region, including but not limited to pre-stressed or perforated portions, or extra-thin or weak portions formed or built into stem 12c. In the illustrated embodiment, in which a portion of the flat, plate-like stem 12c is notched as shown, the stem can be repeatedly bent back and forth by hand to strain-harden the material between the notches, with the result that battery end 12 finally breaks off cleanly as shown in FIG. 3. It will be understood that fused terminal 11 is primarily made from conductive metal, for example copper or copper alloy coated with tin.

Figure 4:
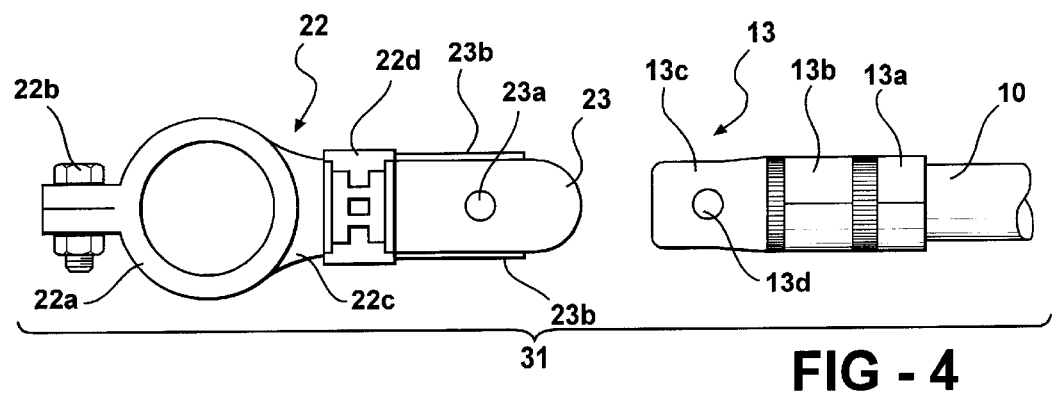
FIG. 4 is a plan view of a new, replacement fused battery end replacing the original battery end.
Figure 4A:
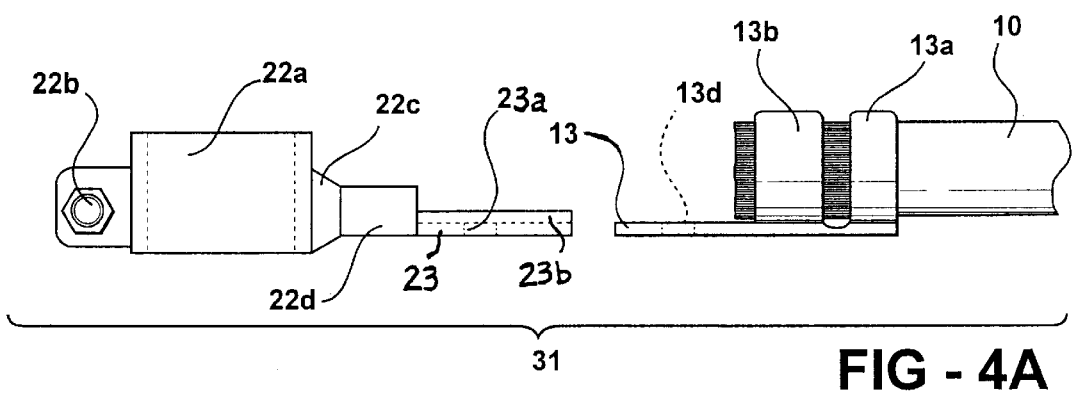
FIG. 4A is a side elevational view of FIG. 4.

Referring next to FIGS. 3 and 3B, battery end 12 with its blown fuse link 12d has been separated from cable-connecting end 13, with the result that stem 13c now becomes a serviceable connection joint ready to receive a new, replacement fused battery end 22 as shown in FIGS. 4 and 4A.

Replacement battery end 22 is similar to original battery end 12, in that it includes similar battery engaging structure such as clamping halves 22a, bolt 22b, and stem portion 22c with a fuse link 22d. However, the portion of stem 22c to the right (or cable side) of fuse link 22d is designed as a serviceable attachment connection designed to mate with the serviceable reattachment structure 13c, 13d of cable-connecting end 13, which remains on cable 10. In the illustrated embodiment, serviceable attachment section 23 includes a hole 23a and sidewalls 23b which function as guides sized to accept and receive reattachment portion 13c from cable-connecting end 13 of the original terminal.

Figure 5:
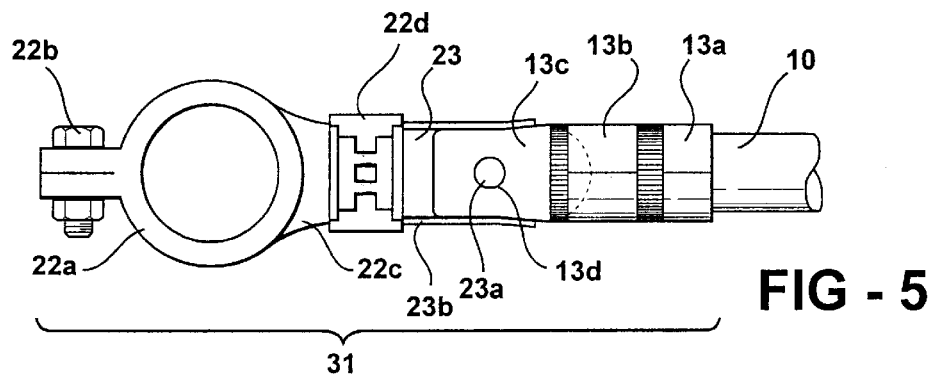
FIG. 5 illustrates the replacement battery end of FIG. 4 being mated with the serviceable, cable-connecting remainder of the original terminal.
Figure 5A:
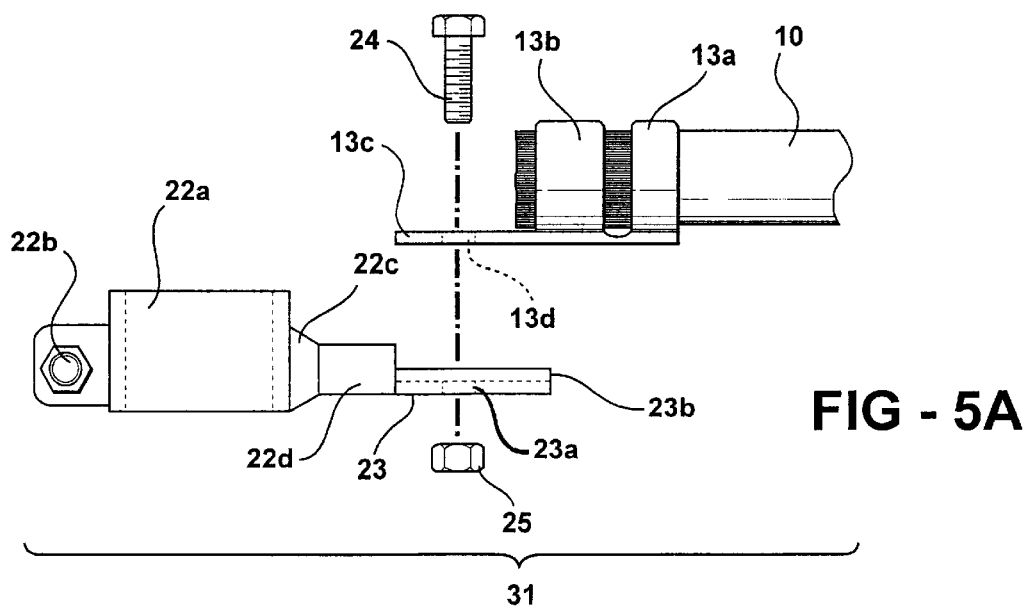
FIG. 5A is a side elevational view of FIG. 5.

As shown in FIGS. 5 and 5A, once reattachment section 13c of cable-connecting end 13 has been placed on and aligned with attachment portion 23 of replacement battery end 22 such that holes 13d and 23a are aligned, a bolt 24 can be inserted through the holes and secured with a nut 25 to securely join replacement end 22 and original cable-connecting end 13 as a new fused terminal 31.

Figure 6:
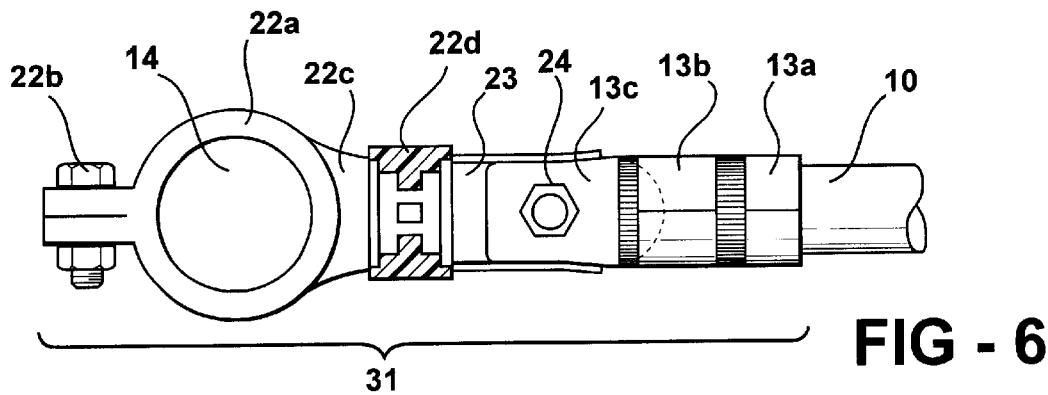
FIG. 6 illustrates the replacement battery end and the original, serviceable cable-connecting remainder secured together to form a new fused battery terminal.
Figure 6A:
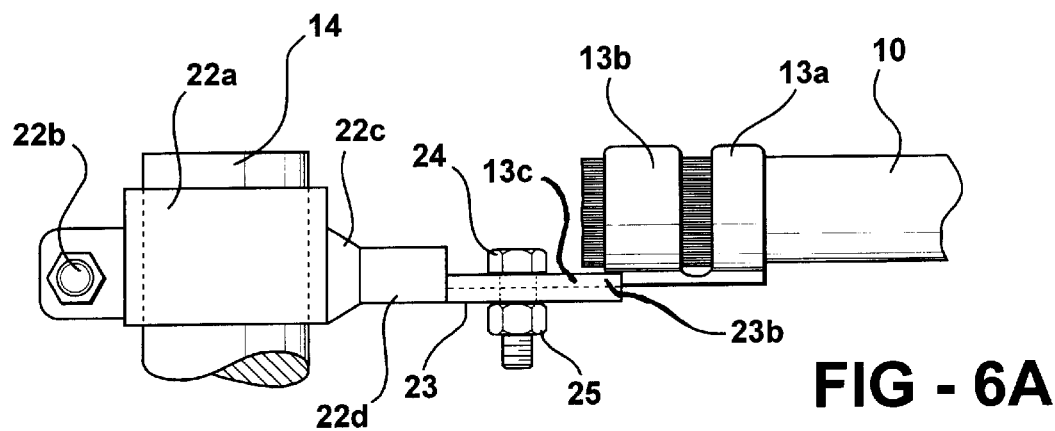
FIG. 6A is a side elevational view of FIG. 6.

Referring to FIGS. 6 and 6A, the new fused terminal 31 is as easily serviced and repaired in the field as the original fused terminal 11, if not more so given the bolt-together connection. In fact, it will be recognized by those skilled in the art that rather than a breakaway battery end 12 as shown in FIGS. 1–3, the original fused terminal according to the invention can be provided in the form of bolted-together fused terminal 31 shown in FIG. 6.

Although a bolt-together reattachment structure is illustrated, it will be understood that other known connecting structures can be used, including but not limited to welds, solder, pins, screws, conductive adhesives, mating male and female connectors, and the like. The bolt-together arrangement is merely convenient and preferred.

The foregoing invention improves serviceability in that the original cable-connecting end 13 of the original terminal need not be removed from the end of cable 10. Removing cable-connecting end 13 from the cable can be a time-consuming and difficult task, possibly requiring the re-cutting of the cable to establish a new crimped-together attachment between the terminal and the exposed wire on the end of the cable. This is not always possible in automotive cable runs in which the original length of cable 10 may not allow shortening to remove an old crimped-on terminal and apply a new one.

From the foregoing it will be understood that the present invention is capable of practice in many forms with only minor modifications or variations from the illustrated embodiments disclosed. It will therefore be understood that the foregoing examples of the invention are not intended to limit the invention beyond the scope of the appended claims. Variations in the fuse link 12d known to those skilled in the art are possible, especially as to the type of fuse and the manner in which it is built into or incorporated in battery end 12. The nature of the terminal connection portion 12a can vary widely according to structures known in the art without departing from the invention. Likewise, the exact structure and nature of connection between cable-connecting end 13 and cable 10 can vary according to known alternatives without departing from the invention.

Accordingly,

We claim:

1. A fused battery terminal comprising:

a battery end having a portion adapted to be removably secured to a battery terminal or post, and a fuse link;

a cable-connecting end connected to the battery end and including a serviceable reattachment portion designed to remain connected to a cable; and a separable region joining the battery end portion and fuse link with the cable-connecting end, the separable region having means preformed for being destructively broken, wherein the battery end of the fused terminal with the removably secured portion and the fuse link can be separated from the cable-connecting end without damaging the cable-connecting end and removing the cable connecting end from the cable.

2. The fused battery terminal of claim 1, further comprising a replacement battery end including a portion adapted to be connected to a battery terminal or post, a fuse link, and an attachment part for connection to the reattachment portion of the cable-connecting end secured to the cable.

3. The fused battery terminal of claim 2 wherein the attachment part of the replacement battery end has a means for guiding the attachment part into engagement with the reattachment portion of the cable-connecting end.

4. The fused battery terminal of claim 1 wherein the separable region is an integral stem extending between the battery end with the removably secured portion and fuse link and the cable-connecting end.

5. The fused battery terminal of claim 4 wherein the preformed means is a weakened segment of the stem.

6. The fused battery terminal of claim 1 wherein the serviceable reattachment portion has a means for fastening the cable-connecting end to a replacement battery end.

* * * * *

UNITED STATES PATENT AND TRADEMARK OFFICE
CERTIFICATE OF CORRECTION

| | | |
|---|---|---|
| PATENT NO. | : 6,607,860 B2 | Page 1 of 1 |
| DATED | : August 19, 2003 | |
| INVENTOR(S) | : Benjamin C. Hulbert et al. | |

It is certified that error appears in the above-identified patent and that said Letters Patent is hereby corrected as shown below:

<u>Column 4,</u>
Line 47, please add claim 7 as follows:

7. The fused battery terminal of claim 1 wherein the preformed means comprises notches in the separable region.

Signed and Sealed this

Sixth Day of January, 2004

JAMES E. ROGAN
*Director of the United States Patent and Trademark Office*